Oct. 9, 1928.
T. H. JONES
1,687,095
COFFEE URN
Filed July 22, 1925
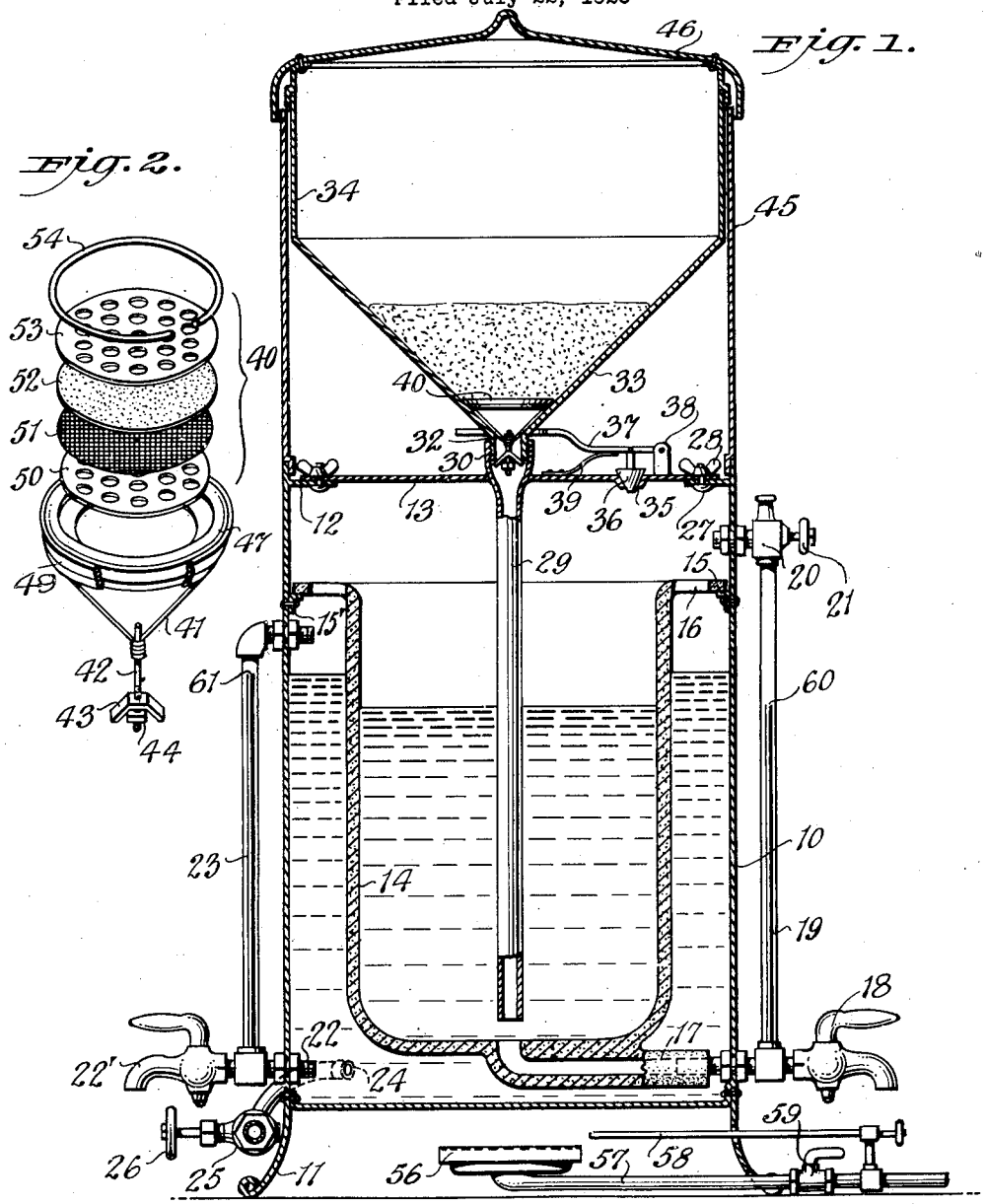
INVENTOR
*Thomas H. Jones*
BY
*Russell Band*
ATTORNEY Patented Oct. 9, 1928.

1,687,095

UNITED STATES PATENT OFFICE.

THOMAS H. JONES, OF PLAINFIELD, NEW JERSEY.

COFFEE URN.

Application filed July 22, 1925. Serial No. 45,297.

My invention relates particularly to an apparatus for brewing coffee and like substances and while it is especially adapted for use in hotels, restaurants and boarding houses, etc.
it will be evident that it could also be used in smaller size for domestic purposes.

In brewing coffee it is desirable not to boil the coffee but to steep it in water just below the boiling temperature until all the soluble elements are extracted from the coffee.

It is an object of my invention to provide a coffee urn in which coffee ground to powdered form may be used in contrast with the usual custom of employing ground coffee of comparatively coarse granular size. I find that by the use of powdered coffee it is possible to extract the soluble elements more rapidly and more completely than is possible with granular coffee. But while I find it of advantage to use finely powdered coffee 1 wish it to be clearly understood that coarsely ground coffee can also be used in my urn with very excellent results.

Another object of my invention is to provide for forcing hot water, but of a temperature below the boiling point, up through the powdered coffee by means of steam pressure and then returning the water back through the coffee powder by suction or atmospheric pressure.

A further object of the invention is to provide a coffee urn which may be readily taken apart so as to expose all portions that come in contact with the coffee powder and the coffee infusion whereby the parts may be readily cleaned.

With these and other objects in view, my invention consists in certain novel features of construction and combinations and arrangements of parts as will be more fully hereinafter described and pointed out in the claims.

In the accompanying drawings:

Figure 1 represents a vertical section of my coffee urn fully assembled;

Fig. 2 is a perspective view of a filter employed in my coffee urn with various members being shown in disassembled relation and one member partly broken away for the sake of clearness; and Fig. 3 shows an enlarged vertical section of my filter.

In the drawings I have used numeral 10 to indicate a vessel which serves as a boiler in my coffee urn. This vessel is supported on a suitable base 11. The bottom of the vessel is closed while near the upper end the vessel is formed with an inwardly projecting flange 12 on which is supported a cover plate 13. Mounted within the boiler 10 is an inner vessel 14 which is preferably of glazed earthenware or of some material that will not impart an unpleasant taste to the coffee infusion. At the upper end of this vessel there is an outwardly projecting annular flange 15 which rests on a shoulder 15' on the wall of the vessel 10. The flange 15 is formed with a number of perforations 16 so that water in the boiler 10 may rise through these perforations and overflow into the vessel 14. Leading from the bottom of the vessel 14 is a pipe 17 which passes out through the boiler 10 and is fitted with a stop cock 18. A glass gauge 19 running from the pipe 17 to the upper part of vessel 10 permits of determining the level of water in the vessel 14. At the upper end of this gauge there is a relief cock 20 controlled by a valve wheel 21, the purpose of which will be explained presently. Preferably at the opposite side of the vessel 10 there is an outlet pipe 22 controlled by a stop cock 22' through which water may be drawn off from the vessel 10. A sight glass 23 permits of determining the level of water in the boiler 10. The boiler 10 may be filled with water through a pipe 24 which is connected with any suitable source of water supply. A valve 25 controls the admission of water through the pipe 24 and it is desirable that this valve be of the spring closing type so that on releasing the valve handle 26 the water will be automatically closed off.

As mentioned above, the upper end of the vessel 10 is closed by a cover plate 13. A series of screws 27 are secured to the flange 12 with their shanks projecting upward through the flange. These screws 27 are adapted to pass through openings in the plate 13 and by means of wing nuts 28 on the screws the cover plate may be securely clamped down upon the flange 12 to effect a steam tight joint. Welded or otherwise firmly secured to the cover plate 13 is a pipe 29 which leads down to a point close to the bottom of vessel 14. The upper end or mouth 30 of the pipe projects slightly above the cover plate 13 and is expanded as indicated in the drawing. The mouth 30 is internally threaded to receive a threaded stem 32 forming the neck of a funnel 33. This funnel constitutes the bottom wall of an upper vessel 34.

In the cover plate 13 there is a port 35 into which fits a valve plug 36. The latter is suspended from a lever 37 fulcrumed in a bracket 38 rising from the cover plate 13. The outer end of the lever 37 is bifurcated to pass on opposite sides of the funnel 33 just above the neck 32. A spring 39 serves normally to press the valve 37 upward. When the conical vessel is screwed into the mouth 30 the valve 36 is forced downward by contact of lever 37 with funnel 33 closing the port 35. On unscrewing the conical vessel from the tube 29 the spring 39 will raise valve 36 uncovering port 35.

Within the funnel 33 close to the neck 32 I place a filter which is indicated as a whole by the reference numeral 40. To hold the filter in place it is secured by ties 41 to a rod 42 which passes through a cross bar 43 and is threaded at its lower end to receive a nut 44. The cross bar 43 is preferably of V-shape as shown in the drawings and is adapted to bear against the lower end of the neck 32. By tightening nut 44 on rod 42, the filter 40 is drawn snugly against the inner surface of the funnel 33.

A jacket 45 is fitted over the vessel 34 and rests upon the top of vessel 10. The lower edge of jacket 45 may be inwardly offset as illustrated so that it will fit snugly within the rim of vessel 10. Resting upon the top of vessel 34 is a cover 46 which may be of any suitable form and preferably is formed to overhang the upper edge of the jacket 45.

The filter which is used in my urn will be readily understood by reference to Figs. 2 and 3. It consists primarily of an annular member 47 bevelled to fit the funnel 33 and having at its lower end an inwardly projecting flange 48. Fitted about this annular member is a rubber gasket 49 which is adapted to provide a steam tight joint between member 47 and the funnel. Within the member 47 and resting upon the flange 48 is a disk 50 of perforated metal. Resting directly on the disk 50 is a second disk 51 of fine wire gauze. On the disk 51 is placed a disk 52 of filter paper and upon the filter paper is placed another disk 53 of perforated metal. The four disks are held in place in member 47 by a split ring 54 of spring wire which is sprung under an inwardly projecting rim 55 on the member 47.

At the bottom of the urn there is a burner 56 which is connected by pipe 57 with any suitable source of fuel. An auxiliary pipe 58 leads from pipe 57 to the burner 56 and is adapted to provide a flame by which the burner may be lighted whenever valve 59 is opened to admit fuel to the burner pipe 57 is opened to admit fuel to the burner 56.

In operation the valve 25 is turned to admit water to the vessel 10. The water overflows into the vessel 14 and when the level of water in the vessel 14 has reached a pre-determined point, indicated in the drawing at 60, the valve 25 is released and automatically closes, cutting off the supply of water. The stop cock 22 is then opened to draw off water from the vessel 10 until it falls to a pre-determined level indicated at 61 in the drawing. The vessels 10 and 14 may be filled while the upper vessel 34 is unscrewed from the mouth 30. The port 35 will then be open preventing an air pocket from forming in the upper part of the vessel 10 and forcing water up the tube 29. If, however, it be desired to fill the urn when the port 35 is closed, the relief cock 20 may be opened to relieve the air pocket in the top of vessel 10. The vessels 10 and 14 having been filled to the desired level and the upper vessel 34 having been screwed in place a suitable quantity of powdered coffee is placed in the funnel above the filter 40 the valve 59 is opened to admit fuel to the burner 56, which fuel is immediately lighted by the pilot flame issuing from the pipe 56. The heat from burner 56 eventually boils the water in the boiler 10 and the heat is conducted from boiler 10 to the water in the vessel 14. The steam from boiler 10 at first condenses on touching the water in the vessel 14. However, after the water in vessel 14 has approached the boiling point but before it reaches that point, sufficient pressure will have been developed in the upper part of boiler 10 to force water out of the vessel 14 up through tube 29 through filter 40 and up through the coffee powder lying on the filter. The water will continue to flow up through the coffee extracting a large part of the soluble elements of the coffee. When all the water has been exhausted from vessel 14 and forced up into the coffee chamber 33, it will be followed by bubbles of steam which in passing up through pipe 29 will produce a gurgling sound indicating to the operator that it is time to turn off the heat. The operator then closes valve 59 whereupon the steam in vessel 14 and vessel 10 condenses thereby not only permitting the water to flow back by gravity from the coffee chamber into the vessel 14 but actually causing a lowering of atmospheric pressure producing a suction that draws the coffee infusion back through the powdered coffee or coffee grounds and through the filter into vessel 14. The coffee is then ready to be drawn off through the stop cock 18 as desired and it is kept hot for a considerable period of time by the heat of the water in vessel 10 surrounding it. In this way I produce a double brewing of the powdered coffee, and, because the coffee is ground very fine, I am able to obtain a larger amount of coffee from a given quantity of coffee beans than has been possible with urns as heretofore constructed. Furthermore, the coffee powder is at no time subjected to water that is at the boiling temperature. The material of which vessel 14 is made retards to some extent, the flow of heat so that water in vessel 14 is always somewhat cooler than that in vessel 10. Even at the end of the primary brewing operation the steam bubbles which force their way up the tube 29 are rapidly condensed by contact with the water therein so that the actual temperature of the water that contacts with the coffee is always below the boiling point.

It has heretofore been considered desirable to use finely powdered coffee rather than the coarsely ground coffee now employed but considerable difficulty has been experienced in providing a filter which would not clog up very quickly. This difficulty I have overcome by my construction. Furthermore I employ a filter paper which may readily be renewed after each operation of the coffee urn. As the paper is subjected to considerable pressure during the secondary brewing operation, viz the return of water from vessel 34 to vessel 14, I find it highly desirable to use a screen of very fine mesh as a support for the paper and in order to hold the screen against the pressure to which it is subjected during the return flow of coffee extract, I employ the perforated plate 50. After each operation of the urn it is a simple matter to remove the split ring 54, lift off the upper perforated plate 53 and substitute a new filter paper for the one that has just been used. In this way the coffee urn is kept sanitary.

I have so designed the parts that the coffee urn may be readily taken apart for cleaning. On unscrewing the chamber 34 access may be had to all parts above the cover plate 13 and the cover plate 13 also may be removed by unscrewing the wing nuts 28, when access may be had to the vessel 14. The vessel 14 can be removed to provide access to the interior of chamber 10. However, this is ordinarily hardly necessary because chamber 10 is constantly being sterilized by the boiling water and steam passing through it.

I consider myself at liberty to make other slight modifications and changes in construction without departing from the spirit and scope of my invention as defined in the following claims.

I claim:

1. A method of brewing coffee which consists in boiling a body of water, transferring heat from said body of water to a second body of water, utilizing the steam from the boiling water to force the second body of water through a mass of ground coffee, and then condensing the steam to draw the water back by suction through the coffee.

2. In a coffee urn, the combination of a closed boiler, a hot water vessel within the boiler and communicating at the top therewith, a coffee steeping vessel above the boiler and separated therefrom, a pipe connecting the coffee steeping vessel with the hot water vessel and extending to a point near the bottom of the latter vessel, and a filter in the coffee steeping vessel immediately above the pipe.

3. In a coffee urn, the combination of a closed boiler, a hot water chamber within and in communication with the boiler, a coffee steeping receptacle remote from the boiler, means forming a passage from said receptacle to a point within and near the bottom of said chamber, and a filter in said passage.

4. In a coffee urn, a closed boiler, a hot water chamber within the boiler and having the upper end thereof in communication with the boiler, means for filling the boiler and hot water chamber to pre-determined levels, means for determining said levels, a pipe depending from the top of the boiler into the hot water chamber, and extending to a point close to the bottom of said chamber, a coffee steeping receptacle above and spaced from the boiler, said receptacle having a port communicating with said pipe, and a filter in said port.

5. A coffee urn comprising a burner, a boiler, an open mouthed vessel within the boiler, a plate detachably secured to the top of the boiler and serving to close the boiler, a tube projecting through the plate with one end thereof extending into said vessel, a funnel shaped receptacle having a threaded neck adapted to be screwed into the other end of the tube, a filter mounted in said receptacle adjacent the neck, a jacket resting on the boiler and enclosing said receptacle, and a cover adapted to overlap the jacket and close the top of said receptacle.

6. In a coffee urn, the combination of a closed boiler, a vessel adapted to be secured thereto, a relief valve in the boiler, and means actuated by engagement with said vessel for closing the valve when the vessel is secured to the boiler.

7. In a coffee urn, the combination of a boiler having a relief port therein, a vessel removably secured to the boiler, a lever engaging said vessel, a valve secured to the lever and normally closing said port, and a spring serving to open said valve when the vessel is removed from the boiler.

8. In a coffee urn including a chamber formed with a tapered spout, a filter in the spout, an apertured cross-arm extending across the outer end of the spout, a rod connected with said filter and passing through said arm, and a nut threaded upon said rod and adapted to bear against said cross-arm.

9. In a coffee urn, the combination of a closed boiler, a non-metallic hot water vessel within and communicating at the top with the boiler, a coffee steeping vessel spaced from the boiler, means forming a passage from the coffee steeping vessel to a point within and near the bottom of the hot water vessel, and a filter in said passage.

10. In a coffee urn, the combination of a closed boiler, a vessel of relatively low thermal conductivity within and in communication with the boiler, a coffee steeping receptacle spaced from the boiler, means forming a passage from said receptacle to a point within and near the bottom of the hot water vessel, and a filter in said passage.

11. A method of brewing coffee which consists in boiling a body of water, transferring heat from said body of water to a second and separate body of water, and utilizing the steam from the boiling water to force the second body of water through a mass of ground coffee.

THOMAS H. JONES.